No. 884,396. PATENTED APR. 14, 1908.
W. S. LIVENGOOD.
ROAD GRADER.
APPLICATION FILED FEB. 23, 1906.
3 SHEETS—SHEET 1.
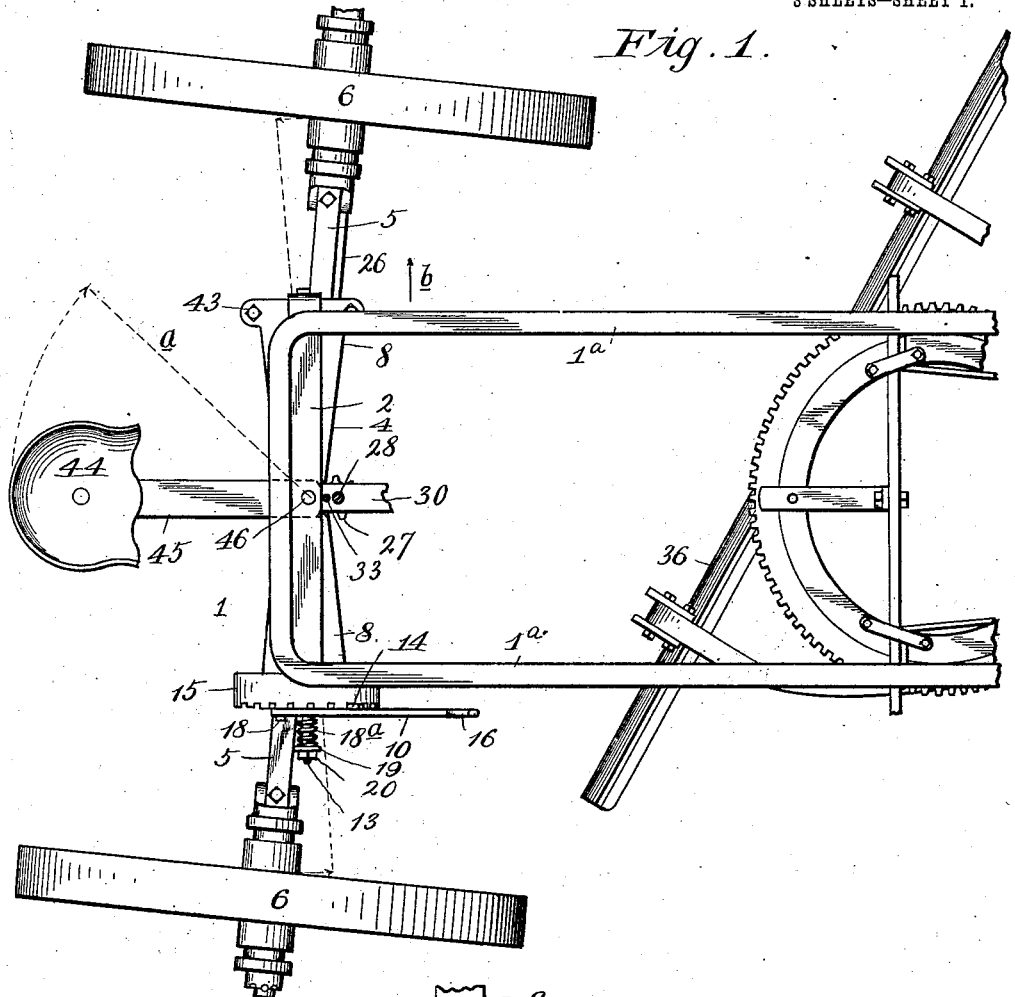
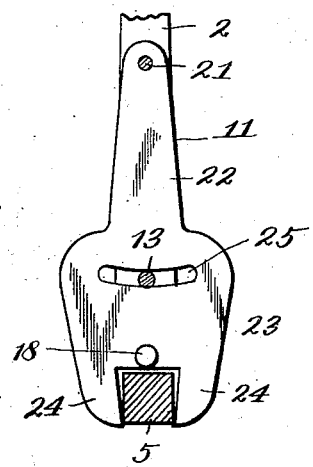
Witnesses:
R. E. Hamilton.
Wm. C. Single.
Inventor,
Winfield S. Livengood
By F. G. Fischer
Atty.

No. 884,396. PATENTED APR. 14, 1908.
W. S. LIVENGOOD.
ROAD GRADER.
APPLICATION FILED FEB. 23, 1906.
3 SHEETS—SHEET 2.
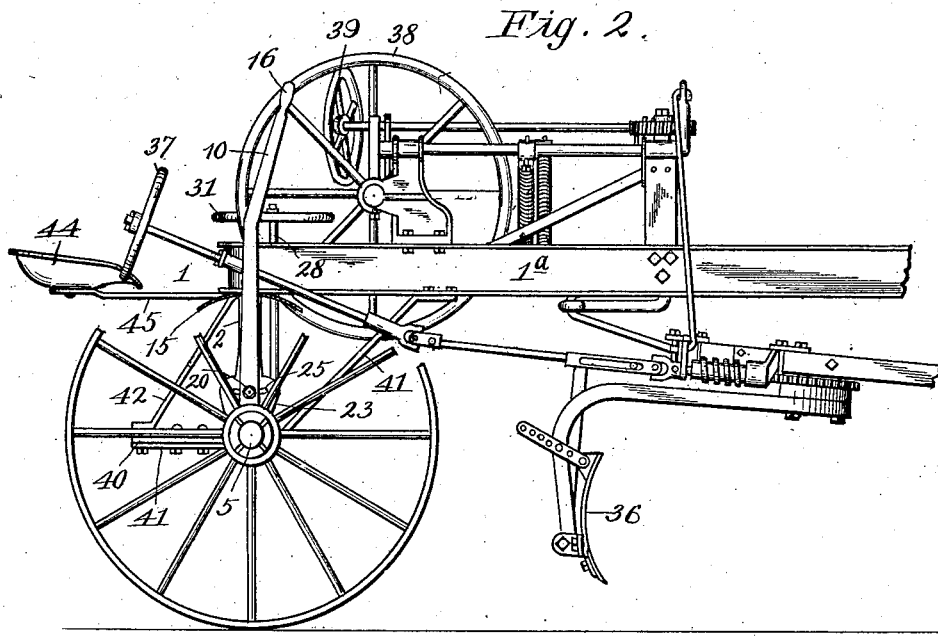
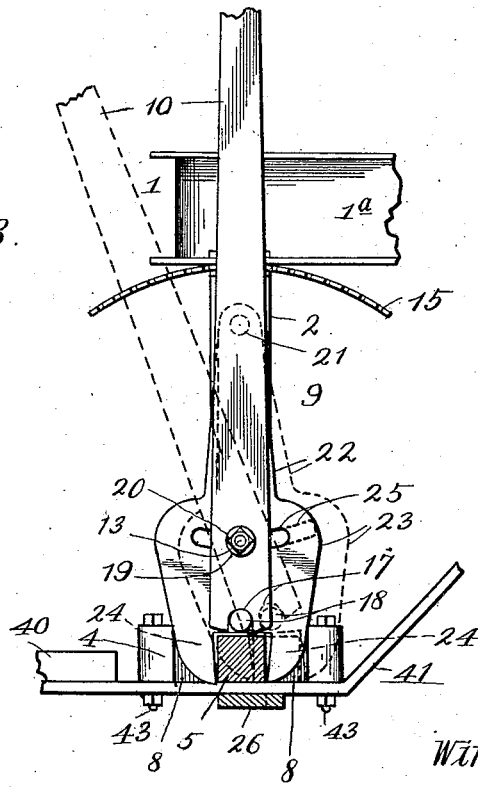
Witnesses:
R. E. Hamilton
Wm. G. Single
Inventor,
Winfield S. Livengood
By F. G. Fischer, Atty.

No. 884,396.　　　　　　　　　　　　　　　　PATENTED APR. 14, 1908.
W. S. LIVENGOOD.
ROAD GRADER.
APPLICATION FILED FEB. 23, 1906.

3 SHEETS—SHEET 3.

Witnesses:
R. E. Hamilton.
W. G. Jingle.

Inventor:
Winfield S. Livengood
By F. G. Fischer, atty.

UNITED STATES PATENT OFFICE.

WINFIELD S. LIVENGOOD, OF KANSAS CITY, MISSOURI, ASSIGNOR TO SMITH & SONS MFG. CO., OF KANSAS CITY, MISSOURI.

ROAD-GRADER.

No. 884,396.  Specification of Letters Patent.  Patented April 14, 1908.

Application filed February 23, 1906. Serial No. 302,409.

*To all whom it may concern:*

Be it known that I, WINFIELD S. LIVENGOOD, a citizen of the United States, residing at Kansas City, in the county of Jackson and State of Missouri, have invented certain new and useful Improvements in Road-Graders, of which the following is a specification.

My invention relates to improvements in road-scrapers or graders, and consists of an adjustable rear axle and means for controlling same, whereby said axle, and the wheels mounted thereon, may be swung and held obliquely to the line of draft and thus counteract the tendency of the scraper-blade to push the rear portion of the machine laterally to said line of draft.

The invention further consists of an adjustable seat pivoted to the rear portion of the machine and arranged adjacent to the hand-wheels for adjusting the scraper-blade, so that an operator may adjust the latter without leaving the seat.

In order that the invention may be fully understood, reference will now be made to the accompanying drawings, in which:—

Figure 4:
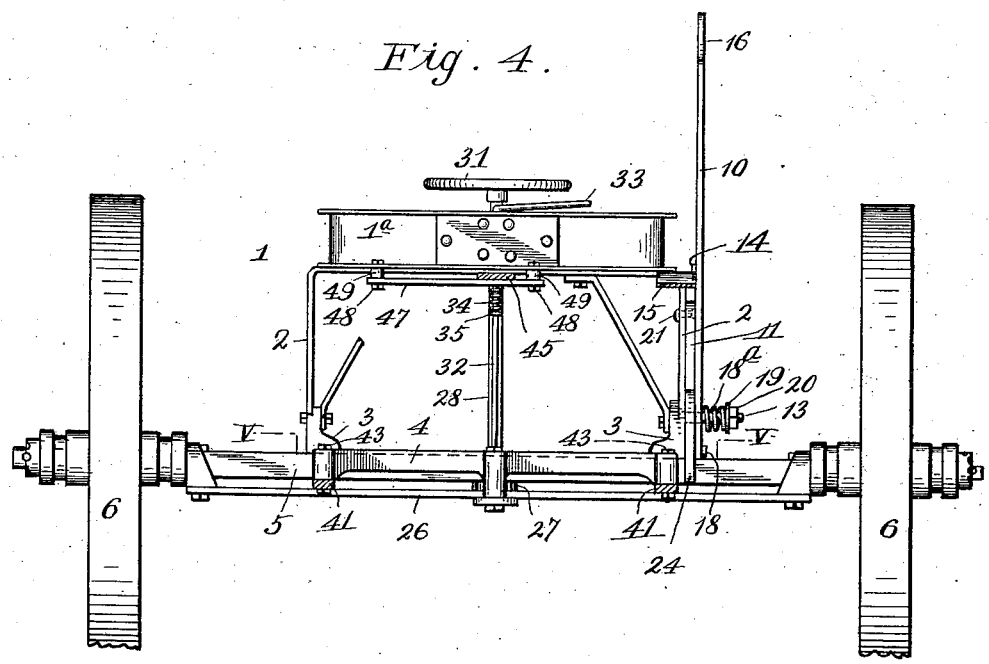
Figure 5:
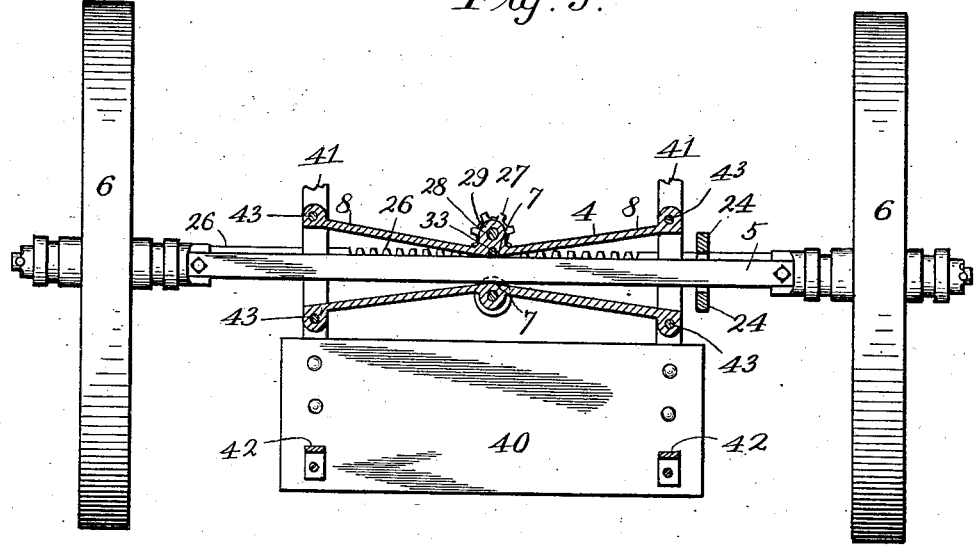
Figure 7:
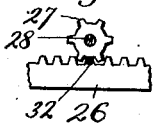

Figure 1 represents a plan view of the rear portion of a road-grader provided with my improvements. Fig. 2 is a side elevation of same with means for adjusting the scraper-blade added thereto. Fig. 3 is an enlarged broken side elevation of the means for adjusting the rear axle obliquely to the line of draft. Fig. 4 is a rear elevation of the machine showing my improvement for adjusting the rear axle, attached thereto. Fig. 5 is a sectional plan view taken on line V—V of Fig. 4. Fig. 6 is an enlarged side elevation of part of the means employed in adjusting the rear axle. Fig. 7 is a detail of a rack and pinion for laterally adjusting the rear frame upon the rear axle.

In said drawings, 1 designates the main frame of the machine and consists of a channel-bar 1ª, an arch 2, secured at its lower terminals to lugs 3, and a bolster 4, embracing the top and side portions of the rear axle 5 upon which the rear wheels 6 are mounted.

Bolster 4 is contracted at its central portion 7 to snugly embrace the rear axle and prevent the latter from moving bodily either forward or backward independent of said bolster. Bolster 4 flares outwardly from its contracted portion 7 toward its enlarged terminals 8 to permit the axle to swing obliquely to the line of draft, as shown by full and dotted lines, Fig. 1, the contracted portion 7 acting as a pivot for the axle to turn upon, said bolster, however, is adapted to slide longitudinally upon the axle when it is desired to shift the rear portion of the frame upon said axle. Axle 5 is adjusted obliquely by means of a compound lever 9 comprising a primary member 10 and a secondary member 11. Member 10 is much longer than member 11 in order to obtain the requisite leverage and is fulcrumed upon a bolt 13 projecting outwardly from one of lugs 3 as shown in Fig. 4. Member 10 is loosely mounted upon said bolt so that it may be moved inwardly or outwardly a short distance when it is desired to engage or disengage its lug 14 from one of the notches of a segment 15 secured to the adjacent side of the arch for the purpose of reliably holding member 10 in its adjusted position. Member 10 is provided at its upper end with a handle 16 and is bifurcated at its lower terminal 17 in order to engage the opposite sides of a stud 18 projecting from the lower portion of member 11.

18ª designates a compression spring interposed between a washer 19 and member 10 in order to push the latter toward segment 15 and thus reliably hold lug 14 in engagement with the notches thereof. The pressure of said spring upon member 10 is regulated by a nut 20 adjustably engaging the threaded outer portion of bolt 13.

Member 11 is fulcrumed at its upper end upon a pin 21, and comprises an arm 22 and a head 23 which latter is provided at its lower terminal with jaws 24 embracing the sides of the axle so that when said secondary member is swung either backwardly or forwardly by the primary member it will carry the adjacent end of the axle therewith, causing the latter to turn on the contracted portion 7. Head 23 is provided with a segmental slot 25 which permits member 11 to swing upon pin 21 without interfering with bolt 13, and its jaws 24 loosely embrace axle 5 so that they may slide upon the latter when the rear portion of frame 1 is adjusted laterally.

Lateral adjustment of the rear portion of the frame is accomplished through the instrumentality of a rack-bar 26, carried by the axle, and a pinion 27 meshing with said rack-bar. Pinion 27 is fixed upon the lower terminal of a shaft 28, journaled in bearings 29 30 and provided at its upper terminal with a fixed hand-wheel 31 whereby said pinion is rotated. Pinion 27 is held from accidental rotation by a latch 32 the lower terminal of which passes through the bolster and is adapted to engage any two teeth of said pinion, while its upper portion, extending through bearing 30, is provided with a handle 33 whereby it may be raised out of engagement with said pinion. The latch is normally held in a lowered position by means of an expansion spring 34 interposed between a collar 35, secured to said latch, and bearing 30.

36 designates a scraper-blade which is adjusted in any desired direction through the instrumentality of hand-wheels 37 38 and 39 and intermediate mechanism. As said scraper-blade and its operating mechanism has been fully described in my application of June 18, 1904, #213,066, further description thereof is deemed unnecessary.

40 designates a platform supported by bars and braces 41 42, respectively, secured to the rear portion of frame 1 so that an operator standing on said platform will be within convenient reach of the hand-wheels and handle 16, and consequently, may adjust the scraper-blade and the rear axle without leaving said platform. Bars 41 are secured to the underside of bolster 4 by means of bolts 43 and extend forwardly beneath the rear axle, thus reliably holding the bolster upon the same.

44 designates a seat provided for the convenience of the operator and in order that it may be swung to one side when not in use, as indicated by the dotted line $a$ Fig. 1, I mount it upon a spring-bar 45 pivotally secured at its forward end to the arch by means of a bolt 46. Bolt 46 is relieved of the greater portion of the weight upon said seat by means of a supporting-bar 47 secured to the underside of the rear portion of channel-bar 1ᵃ by bolts 48 extending through spacing-sleeves 49, which hold the supporting-bar a slight distance beneath the bar 1ᵃ, and also act as stops for limiting the pivotal action of bar 45.

When the machine is drawn forwardly with the scraper-blade engaging the soil and occupying the oblique position shown in Fig. 1, it is obvious that the resistance of the soil upon said blade, if sufficiently great, will move the rear portion of frame 1 in the direction of arrow $b$, cause the rear wheels to slide laterally upon the ground, and thus prevent the machine from properly performing its work unless the pressure of the soil is counteracted. By turning the axle in the same direction as the blade, or as near so as its limited movement will permit, the wheels will be adjusted at an angle to the line of draft and have a tendency to move the rear portion of the frame in a direction opposite to that above referred to, consequently said adjustment will effectually overcome the tendency of the soil to slide the rear wheels in the direction of arrow $b$.

Having thus described my invention, what I claim and desire to secure by Letters-Patent, is:—

1. In a machine of the character described, a frame, an axle adjustably mounted therein, a compound lever, for adjusting said axle in a horizontal plane, consisting of a secondary member, pivoted to the frame, jaws on said secondary member engaging the axle, and a primary member fulcrumed upon the frame and arranged to operate the secondary member.

2. In a machine of the character described, a frame, a rear axle pivotally and slidably mounted therein, and a lever for controlling said pivotal movement, said lever slidably engaging the axle.

3. In a machine of the character described, a frame, a rear axle pivotally and slidably mounted therein, a lever slidably engaging said axle for controlling its pivotal movement and means for controlling said sliding movement.

4. In a machine of the character described, a frame, a bolster forming part thereof, and an axle pivotally and slidably mounted therein.

5. In a machine of the character described, a frame, a bolster forming part thereof, said bolster being contracted intermediate its ends, and an axle extending through said bolster and having pivotal movement on the contracted portion.

6. In a machine of the character described, a frame, a bolster forming part thereof, said bolster being contracted at its central portion and flaring toward its ends, and an axle extending through said bolster and having pivotal movement on the contracted portion.

7. In a machine of the character described, a frame, a seat pivotally secured to the rear portion thereof, and means for limiting said pivotal movement.

In testimony whereof I affix my signature, in the presence of two witnesses.

WINFIELD S. LIVENGOOD.

Witnesses:
F. G. FISCHER,
J. MOORE.